US011316580B2

(12) United States Patent
Shindou et al.

(10) Patent No.: US 11,316,580 B2
(45) Date of Patent: Apr. 26, 2022

(54) COMMUNICATION SYSTEM, RELAY SERVER, COMMUNICATION METHOD AND PROGRAM

(71) Applicant: KDDI CORPORATION, Tokyo (JP)

(72) Inventors: Akihiro Shindou, Tokyo (JP); Keisuke Tsuji, Tokyo (JP); Junji Kinoshita, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/466,200

(22) PCT Filed: Nov. 22, 2017

(86) PCT No.: PCT/JP2017/042094
§ 371 (c)(1),
(2) Date: Jun. 3, 2019

(87) PCT Pub. No.: WO2018/105406
PCT Pub. Date: Jun. 14, 2018

(65) Prior Publication Data
US 2020/0076494 A1    Mar. 5, 2020

(30) Foreign Application Priority Data
Dec. 5, 2016   (JP) .............................. JP2016-236110

(51) Int. Cl.
*G06Q 20/14* (2012.01)
*H04B 7/155* (2006.01)
(Continued)

(52) U.S. Cl.
CPC ............ *H04B 7/155* (2013.01); *G06Q 20/14* (2013.01); *G06Q 40/12* (2013.12); *H04L 67/12* (2013.01); *H04W 88/06* (2013.01)

(58) Field of Classification Search
CPC ........ H04B 7/155; H04W 88/06; G06Q 40/12; G06Q 20/14; H04L 67/12
See application file for complete search history.

(56) References Cited

U.S. PATENT DOCUMENTS 7,457,608 B2 * 11/2008 Shah .................... H04W 84/042
455/351
2005/0099946 A1 * 5/2005 Ito ......................... H04M 15/06
370/230

(Continued)

FOREIGN PATENT DOCUMENTS

| JP | 2010-068068 A | 3/2010 |
| JP | 2013-021453 A | 1/2013 |
| JP | 2016-132368 A | 7/2016 |

OTHER PUBLICATIONS

International Search Report and English translation issued in corresponding International Application No. PCT/JP2017/042094, dated Feb. 20, 2018.

(Continued)

*Primary Examiner* — Dominic E Rego
(74) *Attorney, Agent, or Firm* — Foley & Lardner LLP (57) ABSTRACT

A communication system includes a communication device, a plurality of servers configured to communicate with the communication device, a plurality of communication lines corresponding to a plurality of servers, and a relay server. The relay server includes a communication acquisition part configured to acquire the device identification information for identifying the communication device, the communication content information representing the communication content of the communication device, and the line identification information for identifying a plurality of communication lines respectively; and a communication information output part configured to output the communication content information and the device identification information (Continued)

acquired by the communication acquisition part over a communication line corresponding to the line identification information acquired by the communication acquisition part. The communication device includes a communication output part configured to correlate and output the device identification information, the communication content information, and the line identification information to the relay server.

5 Claims, 5 Drawing Sheets

(51) Int. Cl.
    *G06Q 40/00*     (2012.01)
    *H04L 67/12*     (2022.01)
    *H04W 88/06*     (2009.01)

(56) References Cited

U.S. PATENT DOCUMENTS

| | | | | |
|---|---|---|---|---|
| 2008/0242263 A1* | 10/2008 | Goto | ............... | H04M 15/43 455/407 |
| 2010/0064182 A1* | 3/2010 | Matsubara | ............ | H04L 12/1403 714/48 |
| 2014/0098060 A1* | 4/2014 | McQuade | ............... | G06F 3/045 345/174 |
| 2014/0162623 A1* | 6/2014 | Nagai | ................. | H04L 41/082 455/419 |
| 2014/0316781 A1* | 10/2014 | Jang | ................. | H04M 1/72436 704/235 |

OTHER PUBLICATIONS

[Business strategy], "Problem solving and the next direction are two sides of the same coin, Seeking new usage scenes by making OS free", Nikkei Communications, Japan, Nikkei Business Publication Inc., Jan. 30, 2013, vol. 589, 16-23.

Office Action issued in corresponding Japanese Patent Application No. 2020-155879 dated Jul. 20, 2021 with English translation.

* cited by examiner

|  | LINE IDENTIFICATION INFORMATION | COMMUNICATION CONTENT | DEVICE NAME |
|---|---|---|---|
| COMMUNICATION INFORMATION 1 | APN #1 | VEHICLE CONTROL INFORMATION | COMMUNICATION DEVICE 12 |
| COMMUNICATION INFORMATION 2 | APN #2 | INTERNET COMMUNICATION | COMMUNICATION DEVICE 12 |

FIG. 3B

| LINE IDENTIFICATION INFORMATION | IP ADDRESS (GATEWAY SERVER GW NAME) |
|---|---|
| APN #1 | ip4:10.0.1.0 (GATEWAY SERVER GW1) |
| APN #2 | ip4:10.0.2.0 (GATEWAY SERVER GW2) |

COMMUNICATION SYSTEM, RELAY SERVER, COMMUNICATION METHOD AND PROGRAM

TECHNICAL FIELD

The present invention relates to a communication system, a relay server, a communication method and a program.

The present application claims the benefit of priority on Japanese Patent Application No. 2016-236110 filed on Dec. 5, 2016, the subject matter of which is hereby incorporated herein by reference.

BACKGROUND ART

Conventionally, systems configured to remotely collect vehicle data by way of wireless communication have been known (e.g. Patent Document 1).

CITATION LIST

Patent Document

Patent Document 1: Japanese Patent Application Publication No. 2016-132368

SUMMARY OF INVENTION

Technical Problem

Engineers have not developed any systems using the same communication device to implement wireless communication over communication lines used for remotely collecting vehicle data and wireless communication over communication lines used for mobile phones. For this reason, conventionally, it is necessary to provide communication devices for different communication lines.

The present invention is made in consideration of the aforementioned problem, and therefore the present invention aims to provide communication schemes enabling a single communication device to carry out communications over different communication lines.

Solution to Problem (1) In one aspect of the invention, a communication system includes a communication device, a plurality of servers configured to communicate with the communication device, a plurality of communication lines corresponding to a plurality of servers, and a relay server. The relay server includes a communication acquisition part configured to acquire the device identification information for identifying the communication device, the communication content information representing the communication content of the communication device, and the line identification information for identifying a plurality of communication lines respectively; and a communication information output part configured to output the communication content information and the device identification information acquired by the communication acquisition part over a communication line corresponding to the line identification information acquired by the communication acquisition part. The communication device includes a communication output part configured to correlate and output the device identification information, the communication content information, and the line identification information to the relay server.

(2) In one aspect of the invention according to the communication system of (1), the communication acquisition part further acquires the contract information relating to a plurality of communication lines, which is signed for the communication device. The communication information output part outputs the communication content information and the device identification information acquired by the communication acquisition part over the communication line corresponding to the line identification information according to the contract information acquired by the communication acquisition part.

(3) In one aspect of the invention according to the communication system of (2), the communication output part of the communication device correlates and outputs the device identification information, the communication content information, and the line identification information to the relay server according to a communication priority included in the contract information. The communication information output part of the relay server outputs the communication content information and the device identification information acquired by the communication acquisition part according to the communication priority included in the contract information (4) In one aspect of the invention according to the communication system of (2) or (3), an accounting form is set in correspondence with a plurality of communication lines respectively. The communication system further includes an accounting device configured to carry out an accounting process based on the communication volume for communication of the communication device, the accounting form information representing the form of accounting, the billing-destination information representing the billing destination for billing an amount of payment, the device identification information, and the line identification information.

(5) In one aspect of the invention according to the communication system of any one of (2) through (4), the communication system further includes a communication consumption device configured to consume the communication volume for communication over a predetermined communication line corresponding to the line identification information which is specified in advance in a communication available capacity of a communication terminal different than the communication device which is specified by the contract information correlated to the device identification information.

(6) In one aspect of the invention, a relay server is configured to relay a communication of a communication device to a plurality of servers. The relay server includes a communication acquisition part configured to acquire the device identification information for identifying the communication device, the communication content information representing the communication content of the communication device, and the line identification information for identifying a plurality of communication lines; and a communication information output part configured to output the communication content information and the device identification information acquired by the communication acquisition part over a communication line corresponding to the line identification information acquired by the communication acquisition part.

(7) In one aspect of the invention, a communication method is executed by a communication system including a communication device, a plurality of servers configured to communicate with the communication device, a plurality of communication lines corresponding to a plurality of servers, and a relay server. The communication method includes a communication acquisition step of the relay server device for acquiring the device identification information for identifying the communication device, the communication content information of the communication device, and the line identification information for identifying a plurality of communication lines respectively; a communication information output step of the relay server for outputting the communication content information and the device identification information acquired by the communication acquisition step over a communication line corresponding to the line identification information acquired by the communication acquisition step; and a communication output step of the communication device for correlating and outputting the device identification information, the communication content information, and the line identification information to the relay server.

(8) In one aspect of the invention, a program causes a computer of a relay server to execute a communication acquisition step for acquiring the device identification information for identifying a communication device, the communication content information of the communication device, and the line identification information for identifying a plurality of communication lines respectively; and a communication information output step for outputting the communication content information and the device identification information acquired by the communication acquisition step over a communication line corresponding to the line identification information acquired by the communication acquisition step.

(9) In one aspect of the invention, a program causes a computer of a communication device to execute a communication output step for correlating and outputting the device identification information for identifying the communication device, the communication content information of the communication device, and the line identification information for identifying a plurality of communication lines respectively to a relay server.

Advantageous Effects of Invention

According to the present invention, it is possible to provide communication schemes enabling a single communication device to carry out communications over different communication lines.

DESCRIPTION OF EMBODIMENTS

First Embodiment

Hereinafter, a communication system according to the first embodiment will be described with reference to the drawings.

<Outline of Communication System>

Figure 1:
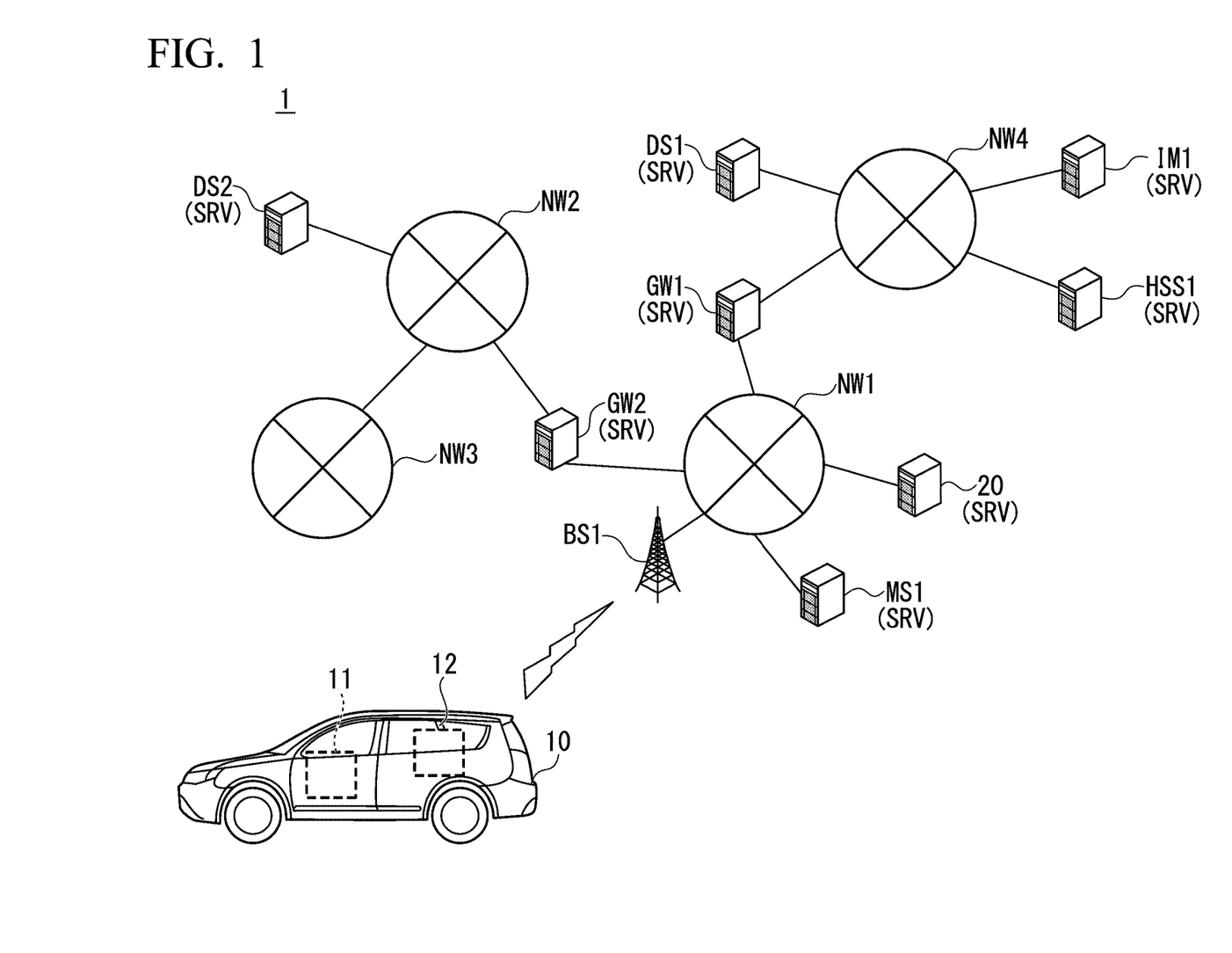
FIG. 1 is a schematic diagram showing an example of a communication system according to a first embodiment.

FIG. 1 is a schematic diagram showing an example of a communication system 1 according to the first embodiment.

The communication system 1 includes a vehicle 10, a plurality of servers SRV, a plurality of communication lines NW correlated to a plurality of servers SRV, and a relay server 20. The following descriptions may collectively refer to servers SRV without discriminating various types of servers connected to communication lines NW. For example, a plurality of communication lies NW include a communication line NW1, a communication line NW2, a communication line NW3, and a communication line NW4.

For example, the communication line NW1 is a communication line of a telecommunication company providing communication services for communication terminals. A plurality of base stations, a gateway server GW1, a gateway server GW2, the relay server 20, and a user management serve MS1 are connected to the communication line NW1.

The following descriptions may collectively refer to gateway serves GW without discriminating the gateway server GW1 and the gateway server GW2. For example, the communication line NW1 is a mobile phone network for implementing communications according a communication method like LTE (Long Term Evolution). In this connection, wireless communications are not necessarily implemented using communication networks according to the LTE system; hence, wireless communications can be implemented using other communication networks according to the 3G system than communication networks according to the LTE system. A communication device 12 wirelessly communicates with the servers SRV through the communication line NW1. Specifically, the communication device 12 may communicate with the servers SRV connected to the communication line NW1 and other servers SRV connected to other communication lines by means of a base station BS1.

The relay server 20 divides the communication destinations to deliver the communication information of the communication device 12 differently according to line identification information. The line identification information is a type of information for identifying multiple communication lines. For example, the line identification information includes APN (Access Point Name). In this example, the APN is an Internet domain name for each gateway server GW. The relay server 20 divides the communication destinations to deliver the communication information of the communication device 12 into the communication line NW4 connected thereto through the gateway server GW1, the communication lines NW2 and the communication line NW3 connected thereto through the gateway server GW2 differently according to the line identification information. In this example, the relay server 20 delivers the information output from the communication device 12 to the gateway server GW1 and the gateway server GW2. For example, the relay server 20 is a DNS (Domain Name System) server. The DNS server converts an Internet domain name expressed in alphanumerical characters into a unique IP (Internet Protocol) address. The communication user management server MS1 carries out mobility management and user authentication. The mobility management is configured to store and manage the information of a base station connected to the communication device 12 when the communication device 12 is connected to a different base station due to movement.

In this example, the communication line NW2 is a communication line of a telecommunication company providing communication services for mobile terminals. The gateway server GW2, the server DS2, and the communication line NW3 are connected to the communication line NW2. The gateway server GW2 is configured to connect the communication line NW1 and the communication line NW2. The server DS2 is configured to store the contract information of users accessing the communication line NW2. For example, the communication line NW3 is a communication network such as the Internet.

In this example, the communication line NW4 is a communication line managed by an automobile manufacturing company producing the vehicle 10. The communication line NW4 is managed by a different company than companies managing communications over the communication line NW1 and the communication line NW2. Alternatively, the communication line NW4 may be a communication line of a different communication company than the communication line NW2. The gateway server GW1, the server DS1, an IMSI management server IM1, and a user contract information server HSS1 are connected to the communication line NW4. The gateway server GW1 connects the communication line NW1 and the communication line NW4. The server DS1 is configured to store the vehicle control information output from an ECU (Engine Control Unit) or a sensor installed in the vehicle 10. The vehicle control information may include the information for controlling the vehicle and the information representing the result of controlling the vehicle. Specifically, the vehicle control information may include various pieces of information representing transactions through in-vehicle communication lines used for controlling the vehicle, such as CAN (trademark registration, Controller Area Network), LIN (Local Interconnect Network), FlexRay (trademark registration), and MOST (trademark registration, Media Oriented System Transport).

The IMSI management server IM1 is configured to store a unique identification for identifying each communication device. In this example, the unique identification for identifying each communication device is a unique identification of SIM (Subscriber Identity Module). In addition, the IMSI management server IM may manage various types of information such as MSISDN (Mobile Subscriber Integrated Services Digital Network Number) and ICCID (Integrated Circuit Card ID). Herein, the MSISDN is a number for identifying a communication contract over the communication line NW. The ICCID is a unique number assigned to a SIM card. The user contract information server HSS1 acquires the user contract information corresponding to a unique identification for identifying each communication device from the IMSI management server IM1. The user contract information server HSS1 stores the information as to which communication line is connected to a terminal possessed by a user making a communication contract with an automobile manufacturing company. In FIG. 1, the user contract information server HSS1 stores the information representing that the communication device 12 is connected to the base station BS1.

The vehicle 10 includes a navigation device 11 and the communication device 12. The navigation device 11 communicates with the servers SRV by means of the communication device 12. The communication device 12 outputs to the servers SRV the vehicle control information or the information from an in-vehicle device such as the navigation device 11 in correspondence with the line identification information. In this example, the communication device 12 outputs the information from an in-vehicle device such as the navigation device 11 to the server DS2 connected to the communication line NW2 and another server (not shown) connected to the communication line NW3. In addition, the communication device 12 outputs the vehicle control information to the server DS1 connected to the communication line NW4.

Next, a procedure of the communication device 12 communicating with the server SRV connected to its communication line will be described.

The communication device 12 is connected to the base station BS1. The communication device 12 communicates with the user management server MS1 via the base station BS1. The user management server MS1 communicates with the relay server 20 to acquire the information representing the position of the user contract information server HSS1 on networks. In this example, the information representing the position on networks is an IP address. The user management server MS1 communicates with the user contract information server HSS1 based on the information representing the position on networks, which is acquired from the relay server 20. The user management server MS1 acquires the contract information of the communication device 12 from the user contract information server HSS1. In this example, the contract information includes the line identification information. The user management server MS1 acquires the contract information from the user contract information server HSS1 to thereby output the contract information to the communication device 12 via the base station BS1. The communication device 12 outputs the vehicle control information to the server DS1 based on the contract information acquired from the user management server MS1. In addition, the communication device 12 communicates with the servers SRV connected to the communication line NW2 and the communication line NW3 based on the contract information acquired from the user management server MS1.

<Functional Configuration of Communication System 1>

Next, an example of the functional configuration of the communication system 1 will be described with reference to FIG. 2.

Figure 2:
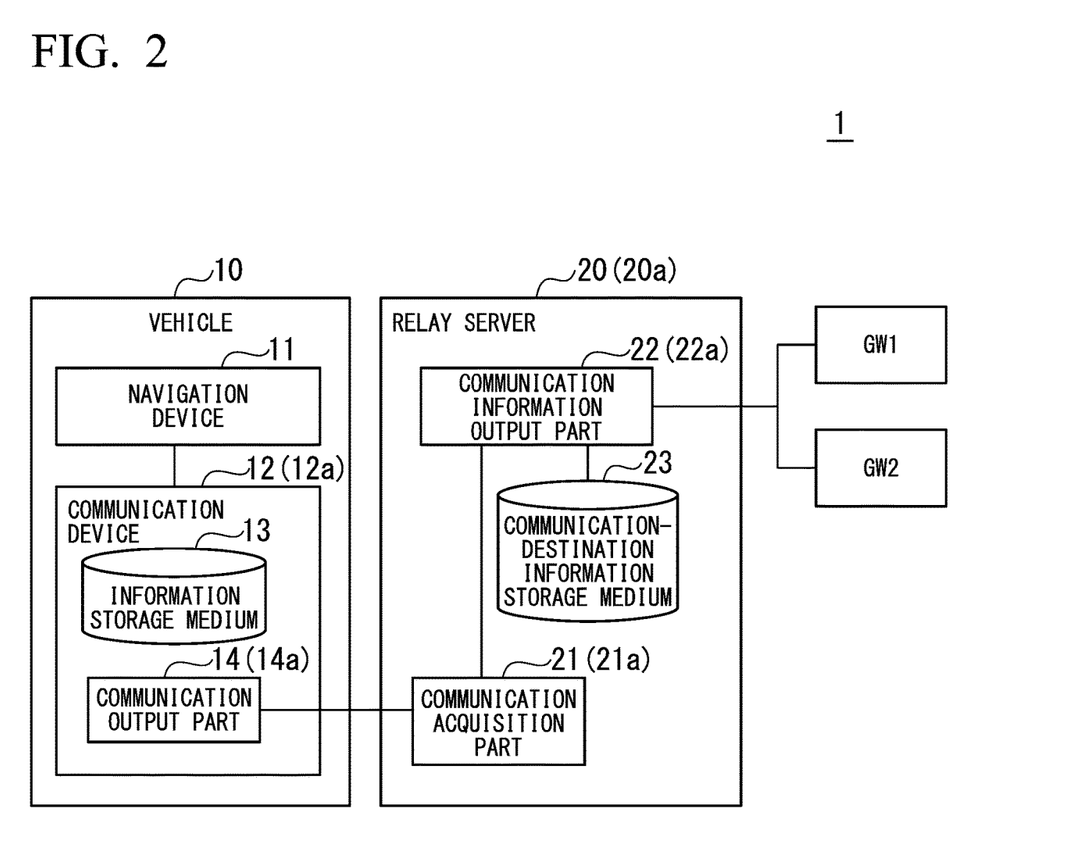
FIG. 2 is a block diagram showing an example of a functional configuration of the communication system according to the first embodiment.

FIG. 2 is a block diagram showing an example of the functional configuration of the communication system 1.

The vehicle 10 includes the navigation device 11 and the communication device 12. The communication device 12 further includes an information storage medium 13 and a communication output part 14.

The navigation device 11 outputs to the communication device 12 the information representing a communication content in correspondence with the line identification information for identifying the communication line used to transmit the communication content. In this example, the navigation device 11 stores the line identification information acquired from the user management server MS1. In this connection, the navigation device 11 may store the line identification information in advance.

The information storage medium 13 stores the device identification information allocated to the communication device 12 when making its communication contract. For example, the information storage medium 13 is a SIM card. In addition, the information storage medium 13 may store the line identification information acquired from the user management server MS1.

The communication output part 14 acquires the communication information of the navigation device 11 as the information representing the communication content. In addition, the communication output part 14 acquires the vehicle control information as the communication content information to thereby output the vehicle control information in correspondence with the line identification information for identifying the communication line used to transmit the vehicle control information.

The communication output part 14 outputs the line identification information, the communication content information, and the device identification information to the relay server 20 via the base station BS1. The following descriptions may refer to the communication information as the correlation information correlating the line identification information, the communication content information, and the device identification information.

The relay server 20 includes a communication-destination information storage medium 23, a communication acquisition part 21, and a communication information output part 22.

The communication-destination information storage medium 23 is configured to store a plurality of IP addresses of gateway servers corresponding to the line identification information.

The communication acquisition part 21 acquires the communication information from the communication output part 14. The communication acquisition part 21 outputs to the communication information output part 22 the communication information acquired from the communication output part 14.

The communication information output part 22 acquires the communication information from the communication acquisition part 21. The communication information output part 22 acquires from the communication-destination information storage medium 23 an IP address of a gateway server corresponding to the line identification information. The communication information output part 22 outputs the communication content information and the device identification information to a gateway server having an IP address acquired from the communication-destination information storage medium 23.

An example of the communication information and the line identification information output from the communication device 12 will be described with reference to FIGS. 3A and 3B.

Figure 3A:
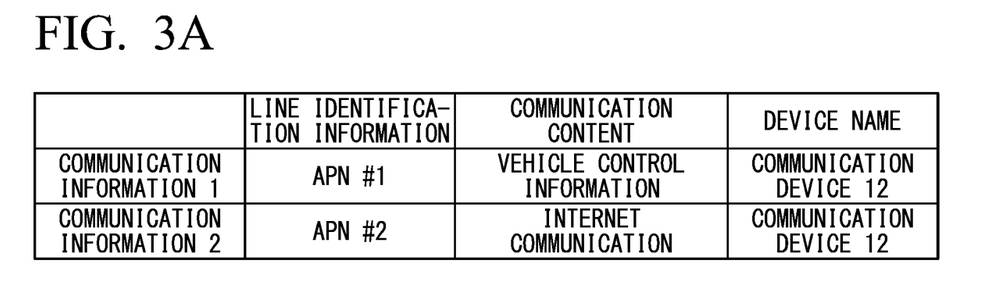
FIG. 3A is a table showing an example of communication information according to the first embodiment.
Figure 3B:
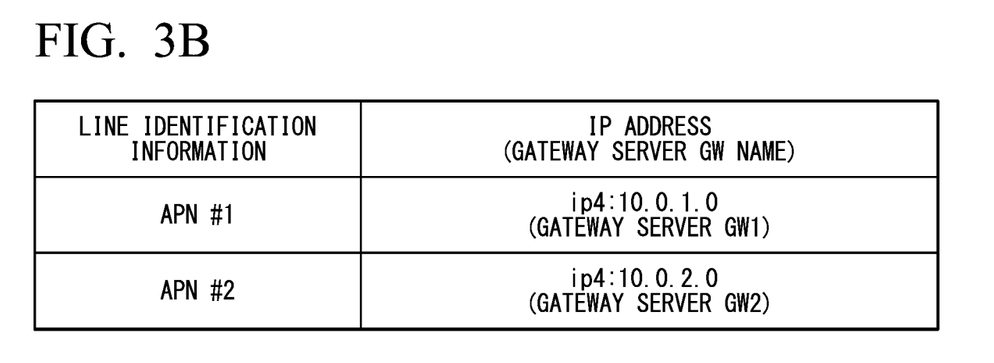
FIG. 3B is a table showing an example of line identification information according to the first embodiment.

FIGS. 3A and 3B are tables showing an example of communication information and an example of line identification information.

FIG. 3A shows an example of communication information. Herein, "communication information 1" is correlated to "vehicle control information" as the communication content information, "APN #1" as the line identification information, and "communication device 12" as the device identification information. In addition, "communication information 2" is correlated to "Internet communication" as the communication content information, "APN #2" as the communication content information, and "communication device 12" as the device name. The device name is a example of device identification information.

FIG. 3B shows an example of line identification information stored on the communication-destination information storage medium 23. The line identification information "APN #1" and the IP address "ip4:10.0.1.0" are correlated and stored on the communication-destination information storage medium 23. The IP address "ip4:10.0.1.0" has been assigned to the gateway server GW1 in advance. In addition, the line identification information "APN #2" and the IP address "ip4:10.0.2.0" are correlated and stored on the communication-destination information storage medium 23. The IP address "ip4:10.0.2.0" has been assigned to the gateway server GW2 in advance.

Upon acquiring the communication information 1, the relay server 20 outputs "vehicle control information" to the gateway server GW1 corresponding to "APN #1". Upon acquiring the communication information 2, the relay server 20 outputs "Intenet communication" to the gateway server GW2 corresponding to "APN #2".

<Outline Operation of Communication Device 12>

Next, an outline operation of the communication device 12 will be described with reference to FIG. 4.

Figure 4:
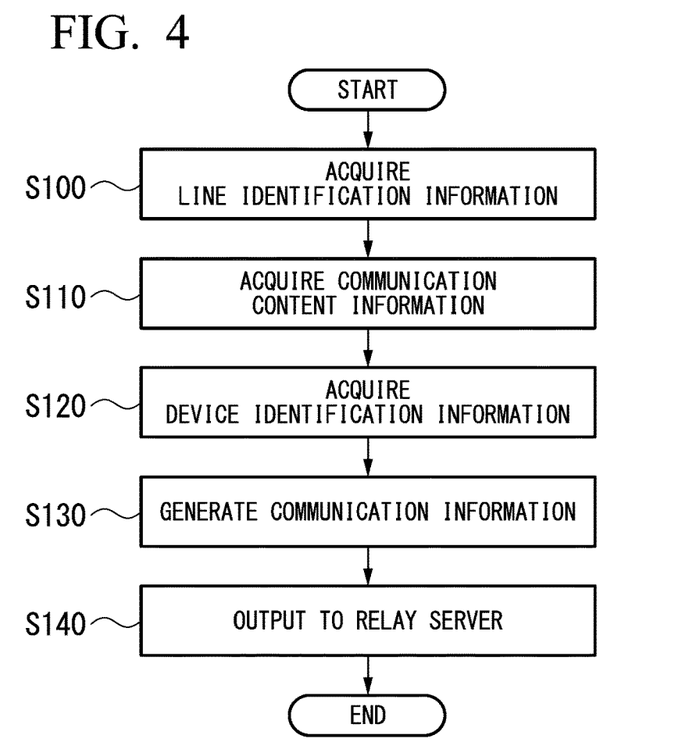
FIG. 4 is a flowchart showing an example of an outline operation of a communication device according to the first embodiment.

FIG. 4 is a flowchart showing an example of the outline operation of the communication device 12. In this connection, an operational procedure illustrated herein is an example of operations, which can be modified by omitting some operations or by adding other operations.

The communication device 12 acquires the line identification information from the user management server MS1 (step S100). The communication device 12 acquires the communication content information from the navigation device 11. Alternatively, the communication device 12 acquires the vehicle control information as the communication content information from the vehicle 10 (step 110). The communication device 12 acquires the device identification information from the information storage medium 13 (step S120). The communication device 12 generates the communication information based on the line identification information acquired from the user management server MS1, the communication content information acquired from the navigation device 11 or the vehicle 10, and the device identification information acquired from the information storage medium 13 (step S130). The communication output part 14 generates and outputs the communication information to the relay server 20 (step S140).

<Outline Operation of Relay Server 20>

Next, an outline operation of the relay server 20 will be described with reference to FIG. 5.

Figure 5:
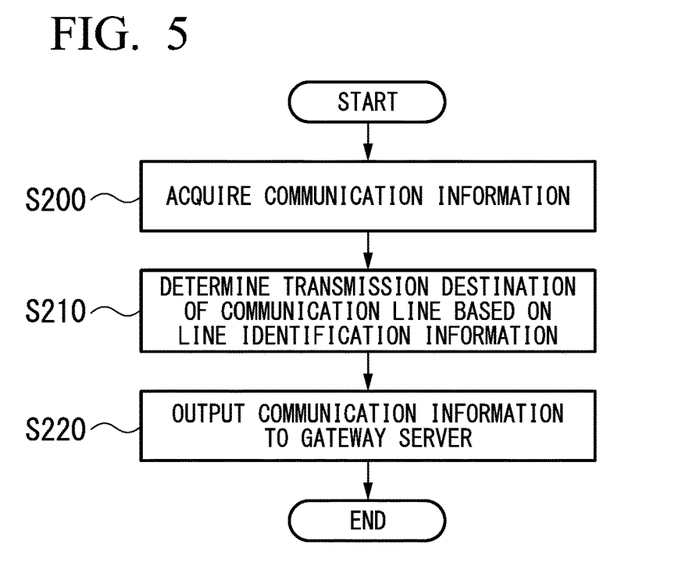
FIG. 5 is a flowchart showing an example of an outline operation of a relay server according to the first embodiment.

FIG. 5 is a flowchart showing an example of the outline operation of the relay server 20. In this connection, an operational procedure illustrated herein is an example of operations, which can be modified by omitting some operations or by adding other operations.

The relay server 20 acquires the communication information from the communication device 12 (step S200). The relay server 20 acquires from the communication-destination information storage medium 23 an IP address of a gateway server corresponding to the line identification information included in the communication information acquired from the communication device 12. The relay server 20 determines the IP address acquired from the communication-destination information storage 23 as an IP address of a gateway server connected to a communication line serving as a communication destination (step S210). The relay server 20 outputs the communication information to the IP address of a gateway server acquired from the communication-destination information storage medium 23 (step S220).

As described above, the communication system 1 includes as plurality of communication lines, the communication device 12, and the relay server 20. The relay server 20 relays a communication of the communication device 12 to the gateway server GW connecting communication lines. The relay server 20 determines a communication-destination gateway server based on the line identification information included in the communication information output from the communication device 12 and a plurality of IP addresses assigned to a plurality of gateway servers GW stored on the communication-destination information storage medium 23.

The communication device 12 of the communication system 1 outputs to the relay server 20 the line identification information, the communication content information, and the device identification information which are correlated to each other. The communication information output from the communication device 12 includes the line identification information representing the destinations to deliver the communication information by the relay server 20.

The relay server 20 is configured to output the communication content information and the device identification information to the communication line identified by the line identification information.

The above descriptions refer to the configuration in which the relay server 20 is connected to the communication line NW1; but this is not a restriction. The relay server 20 can be installed in the communication device 12.

The above descriptions refer to the operation in which the relay server 20 divides the destinations to deliver the communication information of the communication device 12 according to the line identification information; but this is not a restriction. The relay server 20 may divides the destinations to deliver the communication information of the communication device 12 according to the application identification information used to identify an application for generating the communication content information. For example, the relay server 20 may divide the destinations to deliver the communication information according to the application identification information generated by each of an application of the navigation device 11 and an application for generating the vehicle control information.

The above descriptions refer to the operation for assigning the line identification information according to the communication content information; but this is not a restriction. It is possible to assign the line identification information according to an input interface of the communication device 12. When the vehicle control information is input to the communication device 12 via a CAN-communication interface, for example, the communication device 12 may assign the line identification information to a communication line suited to a CAN communication. In addition, the communication device 12 may assign the line identification information representing a communication destination for an Internet communication upon receiving a communication from an interface connecting the navigation device 11 and the communication device 12.

The above descriptions refer to single line identification information correlated to the vehicle control information; but this is not a restriction. The communication device 12 may assign a plurality of line identification information depending on types of vehicle control information. Specifically, when the vehicle 10 is equipped with a plurality of sensors (not shown), the communication device 12 may assign a different type of line identification information for each sensor identifier included in the measurement information of each sensor. In this case, the communication-destination information storage medium 23 is configured to store IP addresses of gateway servers acting as communication destinations in connection with the line identification information assigned thereto.

The above descriptions refer to the communication-destination information storage medium 23 configured to store IP addresses of gateway servers with respect to the line identification information assigned thereto; but this is not a restriction. The communication-destination information storage medium 23 needs to store the information representing the position of a communication destination on networks. For example, the communication-destination information storage medium 23 needs to store IP addresses of other servers SRV than gateway servers.

The above descriptions refer to the communication device 12 configured to output the communication content information from the navigation device 11 to the relay server 20, wherein the device configured to generate the communication content data is not necessarily limited to the navigation device 11. For example, the communication device 12 may relay the information generated by another device installed in the vehicle 10.

In addition, it is possible to change the line identification information assigned to the communication information depending on its communication content. Specifically, when the communication content information represents streaming information of moving pictures which need to be transmitted consecutively, it is possible to assign the line identification information indicating the gateway server GW having a faster response of communication than the normal gateway server GW.

The above descriptions refer to the information storage medium 13 configured to store the device identification information and the line identification information in advance. Herein, it is possible to change the device identification information and the line identification information via wireless communication. Specifically, it is possible change the device identification information and the line identification information via a remote operation by a contract operator of a communication company or an automobile manufacturing company or according to an update command from a relay server. This is because the position of the communication device 12 may be changed due to movement of a user or a vehicle; hence, it is necessary for the communication device 12 to connect to another user management server of another communication company than the previous communication company since a certain communication line may not be used for communication without changing the device identification information and the line identification information. This indicates a possibility that the device identification information and the line identification information stored on the information storage medium 13 would be changed via a remote operation by a contract operator of a communication company or an automobile manufacturing company or according to an update command from a relay server. In this connection, a contract operator of an automobile manufacturing company may update the information required for communication of the communication device 12 irrespective of the operating condition of a contract device of a communication company.

The above descriptions refer to the communication device 12 installed in the vehicle 10; but this is not a restriction. It is possible to install the communication device 12 in another equipment than the vehicle 10, or it is possible to install the communication device 12 in a communication terminal such as a mobile phone. In addition, it is possible to output the communication information from the navigation device 11 to the communication device 12 via wireless communication or wired communication. The navigation device 11 is not necessarily limited to devices having a navigation function. In addition, the vehicle control information may be control information for another equipment than a vehicle. The above descriptions refer to the communication device 12 to carry out wireless communication, which can be changed with wired communication using wired connection.

The information stored on the communication-destination information storage medium 23 installed in the relay server 20 may be stored on the information storage medium 13 installed in the communication device 12. In this case, the communication device 12 acquires IP addresses of gateway servers corresponding to the line identification information.

Second Embodiment

The above descriptions refer to the user management server MS1 configured to acquire the contract information of the communication device 12 from the user contract information server HSS1 connected to the communication line NW4.

Next, a user management server MS1a configured to further acquire different contract information from another user contract information server connected to another communication line NW will be described with reference to FIG. 6.

In this connection, the same configuration and the same operation as the first embodiment will be omitted here by using the same reference signs.

Figure 6:
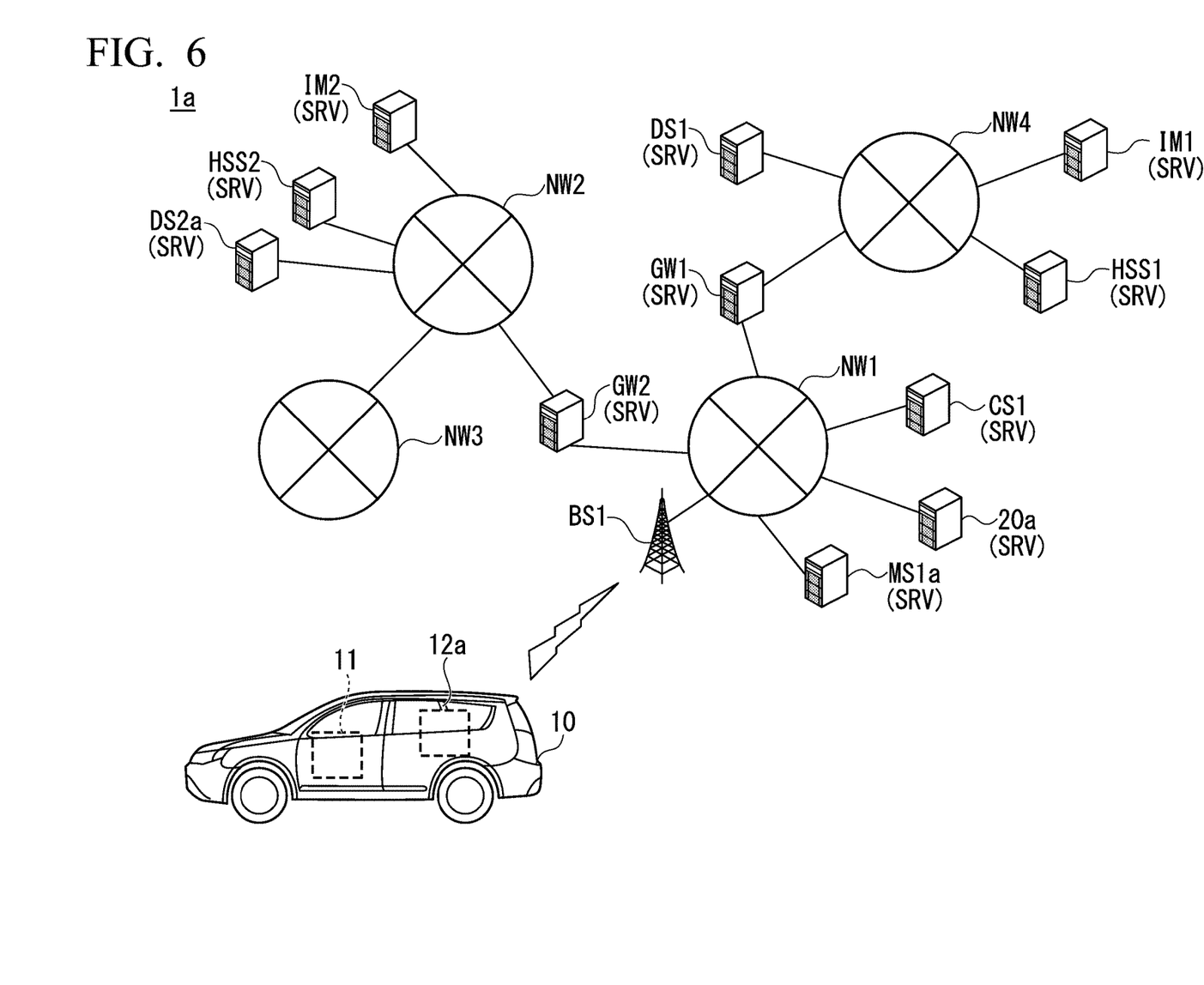
FIG. 6 is a schematic diagram showing an example of a configuration of a communication system according to a second embodiment.

FIG. 6 is a schematic diagram showing a configuration example of a communication system 1a according to the second embodiment.

The communication line NW2 is further connected to a user contract information server HSS2 and an IMSI management server IM2. The user contract information server HSS2 stores the user contract information for connecting to the communication line NW2. The IMSI management server IM2 stores the information for identifying a communication terminal connected to the communication line NW2. The user contract information server HSS2 acquires the contract information for each communication device from the IMSI management server IM2.

The user management server MS1a acquires from the user contract information server SHH1 the contract information for a communication device 12a to carry out communication over the communication line NW4. The user management server MS1a further acquires from the user contract information server HSS2 the different contract information than the contract information acquired from the user contract information server HSS1. That is, the user management server MS1a acquires different sets of contract information which mutually differ from each other. The communication device 12a acquires different sets of contract information from the user management server MS1a. The communication device 12a acquires and outputs the contract information in correspondence with the communication information. In this example, the communication device 12a outputs the contract information depending on its communication content among a plurality of contract information made by the communication device 12a in correspondence with the communication information.

A relay server 20a includes a communication acquisition part 21a and a communication information output part 22a. The communication acquisition part 21a further acquires the contract information relating to a plurality of communication lines, which is signed for the communication device 12a. Based on the contract information acquired by the communication acquisition part 21a, the communication information output part 22a outputs the device identification information and the communication content information over the communication line corresponding to the line identification information. This may allow the communication device 12a to output its communication information over another communication line requiring another communication contract; hence, it is possible to improve user convenience. In this connection, the communication device 12a may acquire different line identification information for each communication contract from the user management server MS1a.

<Communication Contract Including Communication Priority>

Next, the communication contract including a communication priority will be described below. Herein, the communication priority is a degree of prioritizing communications for the relay server 20a to relay a plurality of different communications. The relay server 20a outputs the communication information to gateways such that the communication information having a high priority will be made prior to the communication information having a low priority.

The communication output part 14a of the communication device 12a may output to the relay server 20a the communication priority information included in the contract information, the device identification information, the communication content information, and the line identification information, which are correlated to each other. The communication information output part 22a of the relay server 20a outputs the communication content information and the device identification information acquired by the communication acquisition part 21a according to a priority included in the contract information. In addition, it is possible to change the communication priority according to the communication content.

<Accounting Form Set to Communication Line>

Next, an accounting form set to each communication line will be described below.

Accounting forms are respectively set to a plurality of communication lines. An accounting device CS1 has stored in advance the accounting form and the billing-destination information in connection with the contract information, the device identification information, and the line identification information.

The communication system 1a further includes the accounting device CS1. The accounting device CS1 carries out an accounting process based on a communication volume of the communication device 12a, the accounting form information, the billing-destination information, the device identification information, and the line identification information. The accounting form information represents an accounting form for a communication line. As accounting forms, for example, it is possible to mention billing an amount of payment corresponding to the communication volume of the communication device 12a and billing a fixed amount of payment for a predetermined period of time. The billing-destination information indicates a destination for billing an amount of payment.

The relay server 20a outputs to the accounting device CS1 the device identification information acquired from the communication device 12a, the line identification information, the contract information, and the communication volume information. The communication volume information indicates an amount of information communicated between the communication device 12a and the communication-destination server for receiving the communication information. Specifically, the communication volume information represents an amount of packets or an amount of communication data. In this connection, it is not essential for the relay server 20a to output the communication volume information. Based on the device identification information acquired from the relay server 20a, the line identification information, the contract information, and the communication volume information, the accounting device CS1 carries out an accounting process according to an accounting form corresponding to the line identification information with respect to a billing destination indicated by the contract information, which has been stored in advance based on the communication volume information. Accordingly, it is possible for the communication system 1a to carry out an accounting process according to the contract information and the accounting form for a communication line.

<Consumption of Communication Volume in Communication Available Capacity of Another Contract>

Next, the configuration of the communication system 1a for consuming a communication volume in a communication available capacity of another communication contract will be described below. The communication system 1a further includes a communication consumption device. The communication consumption device consumes a communication volume applied to a predetermined communication line, which is determined in advance according to the predetermined line identification information, in a communication available capacity of a communication terminal, which is specified differently than the communication device 12a based on the contract information correlated to the device identification information in advance. Herein, the server DS2a is an example of a communication consumption device. The server DS2a is configured to store the information representing the communication available capacity, which is allocated by a telecommunication company according to a contract of a mobile phone or the like, in connection with the contract information of a mobile phone. The contract information of a mobile phone is an example of contract information established by another communication terminal. For example, the communication available capacity is a communication capacity applied for each predetermined period. A communication terminal such as a mobile phone consumes a communication volume in a communication available capacity.

The server DS2a stores in advance the contract information of a mobile phone in connection with the device identification information of the communication device 12a.

The relay server 20a outputs to the server DS2a the communication volume information used for communication of the communication device 12a, the line identification information representing a communication destination, and the device identification information of the communication device 12a. The server DS2as receives from the relay server 20a the communication volume information used for communication of the communication device 12a, the line identification information representing a communication destination, and the device identification information of the communication device 12a. The server DS2a consumes a communication volume for communication over a predetermined communication line in a communication available capacity according to a communication contract of a mobile phone corresponding to the device identification information. Specifically, the server DS2a consumes a communication volume for communication over the communication line NW2 in the communication available capacity according to the communication contract of a mobile phone. That is, the server DS2a is configured to consume both the communication volume for communication of the communication device 12a and the communication volume for communication of a mobile phone in the communication available capacity applied to communication of a mobile phone.

Accordingly, the communication system 1a is configured to consume the communication volume of the in-vehicle communication device 12a in the communication available capacity according to the contract which has been already signed for a mobile phone among a plurality of contracts; hence, it is possible to improve user convenience. When the communication available capacity is used up, a user may make an additional payment to proceed with the contract of a mobile phone alone and to thereby increase the communication available capacity. This may relieve users to carry out troublesome procedures to increase the communication available capacity for each communication device.

In addition, it is possible to organize billing destinations with a specific contract by combining the accounting device CS1 and the server DS2a.

When the communication device 12a is a mobile communication terminal while a vehicle and a mobile communication terminal have different information storage media, it is possible to acquire different sets of contract information from the user contract information server HSS1 and the user contract information server HSS2 according to the device identification information.

The communication device 12a is not necessarily limited to a mobile phone, and therefore the communication device 12a may be a communication terminal such as a mobile router. In this case, a mobile router may output the communication information which correlates the communication content information and the line identification information corresponding to the device identification information of a plurality of devices dithering therewith.

In the foregoing embodiments, the communication device 12, the relay server 20, the communication device 12a, and the relay server 20a may include various parts embodied by dedicated hardware elements. Alternatively, those parts may be embodied using a memory and a microprocessor.

The communication device 12, the relay server 20, the communication device 12a, and the relay server 20a may include various parts embodied by a memory and a CPU (Central Processing Unit), wherein programs realizing the functions of the parts installed in the communication device 12, the relay server 20, the communication device 12a, and the relay server 20a are loaded into the memory and executed to achieve their functions.

Programs realizing the functions of the parts installed in the communication device 12, the relay server 20, the communication device 12a, and the relay server 20a may be recorded on computer-readable storage media, wherein programs recorded on storage media are loaded into a computer system an executed to carry out the foregoing processes. Herein, the term "computer system" may embrace Operating Systems and hardware such as peripheral devices.

Upon using the WWW system, the term "computer system" may include homepage providing environments (or homepage display environments).

The term "computer-readable storage media" may refer to flexible disks, magneto-optical disks, ROM, potable media such as CD-ROM, storage units such as hard disks embedded in computer systems. In addition, the term "computer-readable storage media" may include any measures configured to dynamically hold programs for a short period of time such as communication lines used to transmit programs through communication lines like telephone lines and networks like the Internet and other measures configured to temporarily hold programs such as volatile memory inside a computer system serving as a server or a client. Moreover, the foregoing programs may achieve part of the foregoing functions, or the foregoing programs may be combined with pre-installed programs of a computer system to achieve the foregoing functions.

Heretofore, the foregoing embodiments of the present invention have been described with reference to the drawings, wherein concrete configurations are not necessarily limited to the foregoing embodiments; hence, it is possible to apply any modifications to the foregoing embodiment without departing from the subject matter of the invention. In addition, it is possible to combine the configurations of the foregoing embodiments.

REFERENCE SIGNS LIST 1, 1a: communication system
10: vehicle
11: navigation device
12, 12a: communication device
13: information storage medium
14, 14a: communication output part
20, 20a: relay server
21, 21a: communication acquisition part
22, 22a: communication information output part
23: communication-destination information storage medium
CS1: accounting device
DS1, DS2, DS2a: server
GW, GW1, GW2: gateway server
NW, NW1, NW2, NW3, NW4: communication line
BS1: base station
HSS1, HSS2: user contract information server
IM1, IM2: management server

The invention claimed is:

1. A relay server for relaying a first communication using a first communication line having a first server according to first contract information to communicate with a communication device mounted on a vehicle and a second communication using a second communication line having a second server according to second contract information to communicate with a different communication device, wherein the second server is configured to store device identification information of the communication device and a communication available capacity permitted according to the second contract information and to consume a second communication volume for the second communication from the communication available capacity,
    wherein the communication device is configured to acquire vehicle control information from a sensor or an electronic control unit of the vehicle when controlled to be operated,
    wherein upon acquiring line identification information representing either the first communication line or the second communication line, the communication device is configured to generate communication information using the line identification information, the vehicle control information, and the device identification information,
    wherein the communication information is relayed to the first communication line according to the line identification information and the first contract information such that the first server is configured to remotely collect the vehicle control information from the communication device mounted on the vehicle, and
    wherein the relay server performs a communication consumption procedure with the second server in association with the communication device via (i) and (ii),
        (i) the second server receives the line identification information, the device identification information of the communication device, and a first communication volume used for the first communication with the communication device, and
        (ii) the second server consumes the first communication volume for the first communication of the communication device from the communication available capacity when the communication device sends the vehicle control information to the first server.

2. A relay method adapted to a relay server for relaying a first communication using a first communication line having a first server according to first contract information to communicate with a communication device mounted on a vehicle and a second communication using a second communication line having a second server according to second contract information to communicate with a different communication device, wherein the second server is configured to store device identification information of the communication device and a communication available capacity permitted according to the second contract information and to consume a second communication volume for the second communication from the communication available capacity, comprising:
    acquiring by the communication device vehicle control information from at least one of a sensor or an electronic control unit of the vehicle when controlled to be operated,
    acquiring by the communication device, line identification information representing either the first communication line or the second communication line,
    generating by the communication device, communication information using the line identification information, the vehicle control information, and the device identification information,
    relaying the communication information
    to the first communication line according to the line identification information and the first contract information,
    remotely collecting by the first server, the vehicle control information from the communication device mounted on the vehicle, and
    performing a communication consumption procedure with the second server in association with the communication device via (i) and (ii),
        (i) the second server receives the line identification information, the device identification information of the communication device, and a first communication volume used for the first communication with the communication device,
        (ii) the second server consumes the first communication volume for the first communication of the communication device from the communication available capacity when the communication device sends the vehicle control information to the first server.

3. The relay method according to claim 2,
    wherein the first contract information is assigned to the first communication with the communication device of the vehicle, and
    wherein the second server is configured to store the second contract information assigned to the second communication with a different communication device than the communication device of the vehicle in association with the first contrast information.

4. A non-transitory computer-readable storage medium having a stored program causing a computer to implement the relay method according to claim 3.

5. A non-transitory computer-readable storage medium having a stored program causing a computer to implement the relay method according to claim 2.

* * * * *